Figure 1:
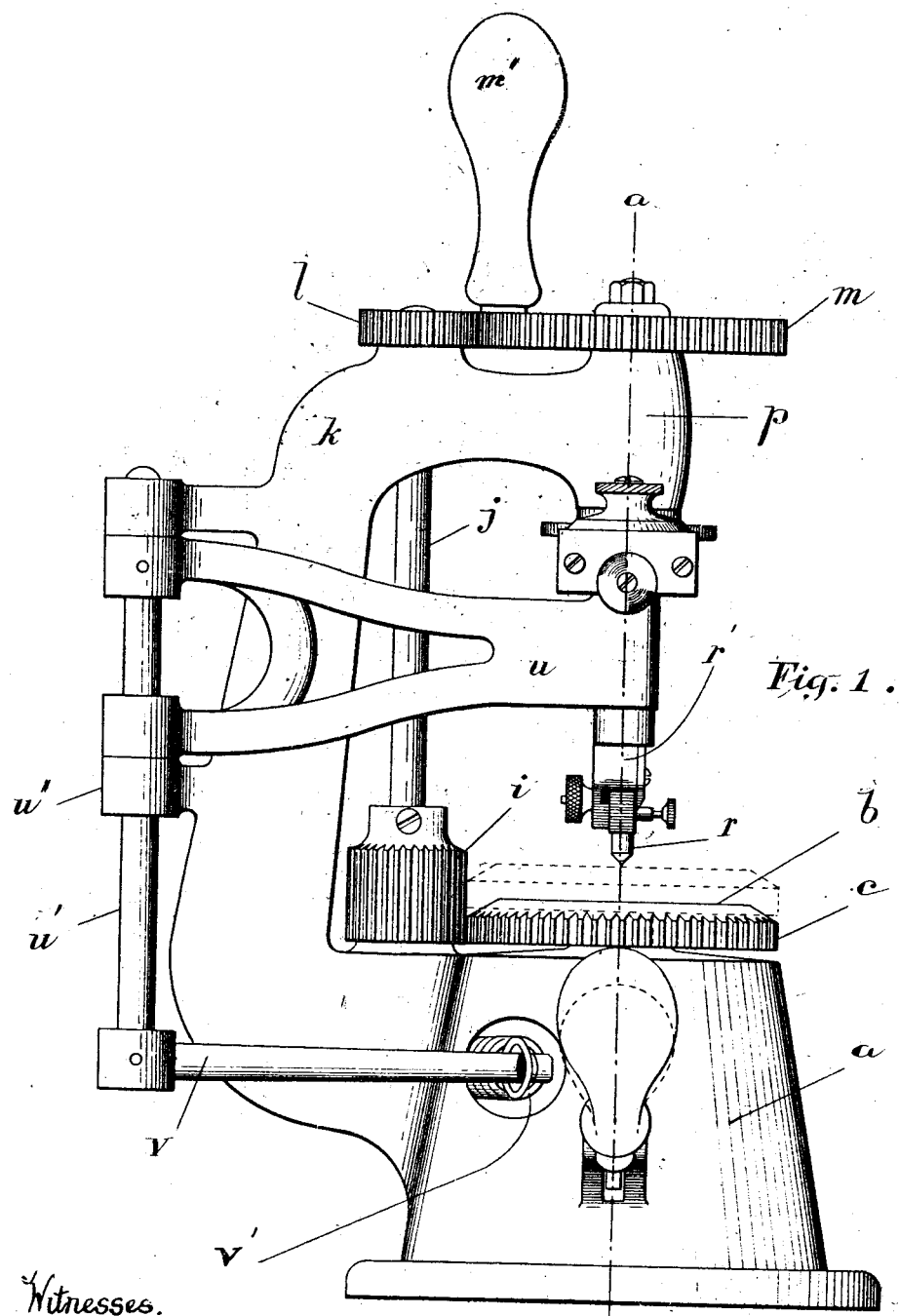

W. C. H. BECK, H. R. ASTRIDGE & A. C. WHITTEKER.
OVAL CUTTING OR MARKING MACHINE.
APPLICATION FILED MAR. 28, 1912.

1,052,880.

Patented Feb. 11, 1913.

3 SHEETS—SHEET 1.

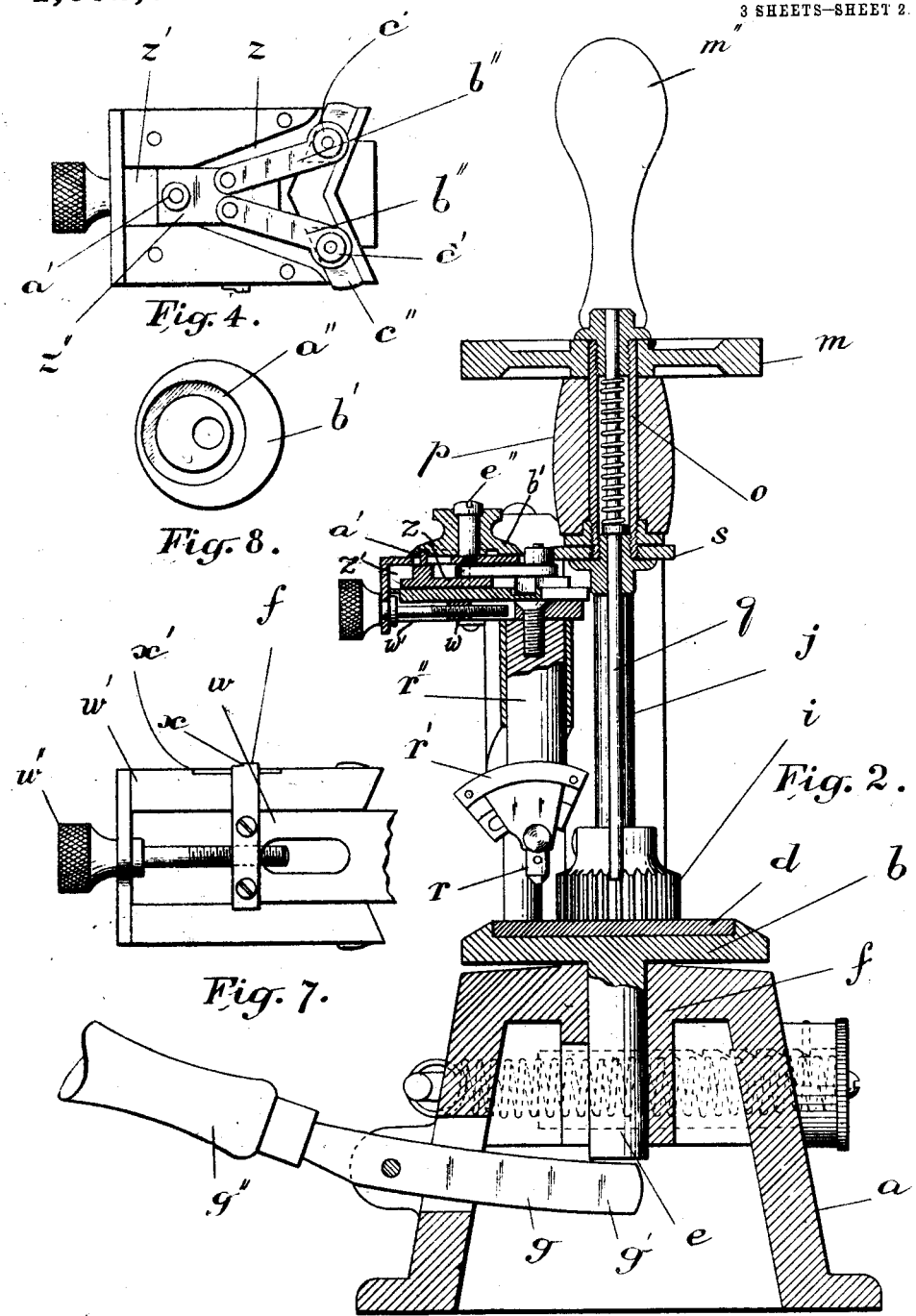

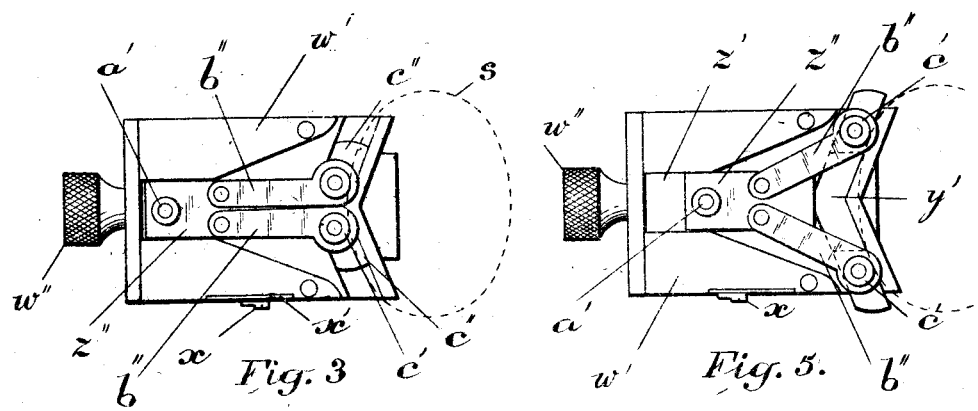

UNITED STATES PATENT OFFICE.

WILLIAM C. H. BECK, HENRY R. ASTRIDGE, AND ARI C. WHITTEKER, OF TORONTO, ONTARIO, CANADA, ASSIGNORS TO CONSOLIDATED OPTICAL COMPANY, LIMITED, OF TORONTO, CANADA.

OVAL CUTTING OR MARKING MACHINE.

1,052,880.  Specification of Letters Patent.  Patented Feb. 11, 1913.

Application filed March 28, 1912.  Serial No. 686,821.

*To all whom it may concern:*

Be it known that we, WILLIAM CHARLES HAMILTON BECK, HENRY R. ASTRIDGE, and ARI C. WHITTEKER, all of the city of Toronto, in the county of York and Province of Ontario, Dominion of Canada, have invented certain new and useful Improvements in Oval Cutting or Marking Machines; and we hereby declare that the following is a full, clear, and exact description of the same.

Our invention relates to a machine for cutting or marking oval or elliptical shapes, and the objects of our invention are: first, to provide a machine of this character, with adjusting means which will accurately govern or control the operative position of the cutting or marking tool with respect to the geometrical center of the work support and thus determine the shape and size of the oval or ellipse with respect to that of the pattern, and: second, to provide the cutting or marking tool with an adjustable tool holder which will permit of the angular relation of the tool to the work support being changed to present the point of the tool approximately perpendicularly to the surface being cut or marked.

For an understanding of our invention, reference is to be had to the following description and to the accompanying drawings, in which:

Figure 1, is a side elevation of our oval cutting or marking machine, showing an end view of the means which governs the operative position of the cutting or marking tool with respect to the geometrical center of the work support during the rotation of the pattern; Fig. 2, is a vertical transverse section on the line $a$—$a$ Fig. 1; Fig. 3, is a plan view, with the cover plate removed, of the adjusting means for determining the shape of the oval, with the pivoted arms forming part of the adjusting means positioned to produce an oval of substantially the same shape as that of the pattern; Fig. 4, is a similar view to Fig. 3, with the pivoted arms expanded to produce an oval of greater minor axis than that of the pattern; Fig. 5, is a similar view to Figs. 3 and 4, with the pivoted arms spread to their limits to produce an oval of a maximum minor axis within the range of the adjusting means; Fig. 6, is a plan view of the sliding head with its related parts removed; Fig. 7, is a broken inverted plan view of the parts shown in Figs. 3, 4 and 5, to show the means for determining the size of the oval with relation to that of the pattern; Fig. 8, is an inverted view of the adjusting head shown in Figs. 1 and 2; Fig. 9, is a plan view of the oval, made by the machine when the adjusting means are in the position shown in Fig. 3, this being also the shape of the patterns used to produce the oval shown in this view and the ovals shown in Figs. 10 and 11; Fig. 10, is a plan view of the oval, made when the adjusting means are in the position shown in Fig. 4; Fig. 11, is a plan view of the oval, made when the adjusting means are in the position shown in Fig. 5. Fig. 12, is a vertical section through the tool holder; and, Figs. 13, 14 and 15 are views of the tool holder showing three different positions of the tool.

Like characters of reference refer to like parts throughout the specification and drawings.

Mounted upon the bed plate $a$, is a rotatable table or work support $b$, having on its rim, gear teeth $c$, meshing with a pinion $i$. The pinion $i$ is fixed to a vertical shaft $j$, journaled in the frame $k$, and the upper end of the shaft $j$ is provided with a pinion $l$ corresponding in diameter and number of teeth with that of the pinion $i$. Meshing with the pinion $l$, is a spur wheel $m$ corresponding in diameter and number of teeth with the gear teeth $c$ of the rotatable table $b$. The spur wheel $m$ is superposed above the rotatable table $b$, and its center is in line therewith. This arrangement of pinions $i$ and $l$ and gear wheels $c$ and $m$, enables the rotatable table $b$ to revolve in unison with and at the same rate of speed as the spur wheel $m$ when the latter is turned. The spur wheel $m$ is fixed to a hollow shaft $o$, journaled in an overhanging arm $p$, and passing through the shaft $o$, is a spring-tensioned presser $q$.

The rotatable table $b$ is vertically adjustable, and, when used for glass cutting purposes, is provided with a cushion $d$. For its vertical adjustment, the rotatable table $b$ is formed with a stem $e$ sliding vertically through a bearing $f$ in the bed plate $a$, and this stem $e$ is engaged by the inner end $g'$ of a lever $g$ fulcrumed to the bed plate $a$.

When the handle end $g''$ of the lever is lowered, its inner end $g'$ raises the stem $c$ and rotatable table $b$ until the work mounted upon the cushion $d$ comes into contact with the lower end of the presser $q$, and, should it be necessary to continue the upward movement of the table to bring the work mounted thereon into contact with the point of the tool $r$, the presser $q$ will give way and move upward in unison with the table until the upward movement of the table is arrested by the work coming into contact with the point of the tool $r$.

Fixed on the shaft $o$, is the pattern $s$ which is preferably of oval or elliptical shape, but which may be of any design suitable for the reproduction of the desired shape in the finished work. The table $b$, gear wheel $m$, shaft $o$, and pattern $s$, revolve in unison, and during its rotation, the pattern during its revolution effects the change of position in the point of the tool $r$ with respect to the geometrical center of the table $b$, as hereinafter described.

The tool holder $r'$ for the tool $r$, is provided with a shaft $r''$ oscillatingly mounted in a swinging arm $u$, fixed on a vertical shaft $u'$, journaled in bearings $u'''$, forming part of the frame $k$, and the shaft $u'$ is provided at its lower end with an arm $v$ tensioned by a spring $v'$ to draw the swinging arm $u$ in the direction of the pattern $s$, the oscillation of the shaft $r''$ maintaining the cutting or marking edge of the tool when correctly set in a plane parallel with the perimeter of the pattern.

So far as the general principle of the parts above outlined are concerned, they are common to machines of this class, and their purpose and operation are known to those skilled in the art, and we do not lay any claim to these features of the machine, except so far as it is necessary for them to enter into combination with the means effecting the adjustment of the tool $r$ with respect to the geometrical center of the table $b$ and governing its position during the rotation of the pattern.

The shaft $r''$ is projected slightly above the top of its bearing in the arm $u$, and fixed on its projected end, is a substantially dovetail block $w$. Adjustably mounted on the dovetail block $w$, is a sliding head $w'$ provided with an adjusting screw $w''$ operating in a screw-threaded bearing in the dovetail block $w$. By means of the screw, the sliding head $w'$ can be adjusted lengthwise of the dovetail block $w$ and it is by means of this adjustment of the sliding head $w'$ that the size of the oval is determined with respect to the pattern $s$, as hereinafter described.

Connected to the dovetail block $w$, is an indicator $x$, which, by means of a graduated scale $x'$ on the side of the sliding head $w'$, accurately ascertains the size of the oval for which the sliding head is adjusted. In the top surface of the sliding head $w'$ is a substantially Y-shaped groove $z$ (see Fig. 6), and movable in the groove part $z'$, is an adjusting block $z''$ provided with a pin $a'$ operating in an eccentric groove $a''$ formed in the bottom surface of the adjusting head $b'$ (see Figs. 3, 6 and 8). Pivoted to the adjusting block $a'$ are two arms $b''$ provided with rollers $c'$ which engage the peripheral surface of the pattern $s$. The free ends of the arms $b''$ are provided with blocks $c''$ operating in the forked groove parts $y'$.

During the movement of the adjusting block $z''$ and arms $b''$ to the right, the blocks $c''$ and free ends of the arms $b''$ move toward the outer ends of the forked groove parts $y'$, and this movement of the blocks $c''$ spreads the arms $b''$ and increases the angle formed by them. The movement of the adjusting block $z''$ and arms $b''$ to the left, draws the blocks $c'$ and free ends of the arms $b''$ inward in the forked groove parts $y'$, and thus decreases the angle formed by them.

The adjusting head $b'$ is rotatable on a stud $e''$, and, as the pin $a'$ for the adjusting block $z''$ operates in the eccentric groove $a''$ in the adjusting head, it is obvious that the turning of the adjusting head will vary the position of the adjusting block $z''$ in the groove part $z'$, and also that the adjusting block $z''$ can be accurately moved to any predetermined position in the groove part $z'$ within the limit of its adjustment to spread the arms $b''$ to the required angle. The spreading of the arms to the required angle determines the minor axis of the oval, with respect to that of the pattern as the pattern revolves the major axis of oval remaining the same as that of the pattern during the revolution. For instance, if the adjusting block $z''$ is moved in the grooved part $z'$ to the left limit of its adjustment, the arms $b''$ will be brought approximately together, as indicated in Fig. 3. This will cause the production of an oval shape of substantially the same major and minor axes as those of the pattern $s$, see Fig. 9.

If the adjusting block $z''$ is moved to the right limit of its adjustment, it will spread the arms $b''$ to the limit of their separation from each other, see Fig. 5. This will produce from an oval pattern of substantially the shape shown in Fig. 9 an oval of the same major axis as the pattern $s$, and of a greater minor axis than the pattern, i. e. the oval, instead of being a perfect ellipse, will approximate more closely to that of a circle, see Fig. 11.

An intermediate position of the adjusting block $z''$ will effect an intermediate adjustment of the arms $b''$, as shown in Fig.

4, and consequently produce from an oval pattern of substantially the shape shown in Fig. 9 an oval, such as shown in Fig. 10, of substantially the same major axis as the pattern, but of a minor axis varying between that shown in Figs. 9 and 11.

To increase the major and minor axes of the oval, the adjusting screw $w''$ is turned to move the sliding head to the right, i. e. in the direction of the pattern. This movement of the sliding head has the effect of forcing the cutting tool outward from the geometrical center of the rotatable table $b$, and the outward movement of the cutting tool will increase the length of both the major and the minor axes of the oval shape of the pattern without disturbing the constant of difference between them, i. e. if the major axis is 41 millimeters and the minor axis is 32 millimeters, the constant of difference between these major and minor axes is 9 millimeters. If the cutting tool is moved outward 2 millimeters from the position for this oval, it will increase the major axis to 43 millimeters and the minor axis to 34 millimeters, thus maintaining the same constant of 9 millimeters between them.

The tool holder $r'$ is fixed to the lower end of the oscillating shaft $r''$, and is provided with a depending plate $r^3$ in the inner face of which is a segmental groove $r^4$, the center from which the segmental groove $r^4$ is described is at the point $r^6$ of the tool $r$, so that the point of the tool, regardless of the change in its angular relation to the rotatable table $b$, will always remain in the same horizontal plane both during the angular adjustment of the tool to the rotatable table and the movement of the tool with the swinging arm under the influence of the pattern $s$. The tool $r$ is provided with a tool head $r^7$ having a curved block $r^9$ contained in the segmental groove $r^4$. Formed through the depending plate $r^3$, is a segmental slot $r^8$ concentric with the segmental groove $r^4$, and the segmental block $r^9$ is provided with a screw-threaded pin $r^{10}$, projecting through the segmental slot and provided with a nut $r^{12}$ by which the tool head may be locked in its adjusted position.

For cutting a convex surface, $s^5$ the tool head is moved to the outer end of the segmental groove $r^4$, see Fig. 13 and locked in its adjusted position. This position of the tool head causes the tool $r$ to incline toward the center of the rotatable table $b$, and presents the tool point $r^6$ approximately perpendicularly to such convex surface, $s^5$. When the tool head is moved to the inner end of the segmental groove $r^4$, the tool point $r^6$ is inclined from the geometrical center of the rotatable table, see Fig. 15 this being the position of the tool when cutting a concave surface, $s^6$ as this adjustment presents the tool point $r^6$ approximately perpendicularly to such concave surface. For a flat surface, $s^7$ the tool head is adjusted to a position intermediate the center and outer ends of the segmental groove, see Fig. 14 so that the tool point will be approximately perpendicular to the surface of the rotatable table, and consequently perpendicular to the flat surface, $s^7$ to be cut or marked.

When the cutting tool $r'$ is correctly adjusted to the geometrical center of the rotatable table or work support $b$ to produce an oval of the required size, and the arms $b''$ are adjusted to produce an oval of the required shape, motion is imparted to the spur wheel $m$ preferably by means of a handle $m''$. This motion of the spur wheel causes the revolution of the hollow shaft $o$, and the pattern $s$, and, as the pattern revolves, it presses against the anti-friction rollers $c'$ journaled to the arms $b''$.

During the revolution of the pattern $s$, it causes through its engagement with the anti-friction rollers, the oscillating movement of the swinging arm $u$, and this movement of the swinging arm changes the position of the cutting tool with respect to the geometrical center of the table $b$. If the pattern $s$ is of an elliptical shape, it will, during its revolution, move the swinging arm outward to the limit of the major axis of the pattern, the return movement of the swinging arm toward the geometrical center as the minor axis comes into position with the anti-friction rollers, being effected by the spring $v'$, which continually maintains the anti-friction rollers $c'$ in contact with the peripheral surface of the pattern $s$.

The oscillation of the shaft $r''$, tool holder $r'$, and tool $r$, is governed by the contact of the anti-friction rollers with the peripheral surface of the pattern, and when the tool at the commencement of the work is properly adjusted to the path it is required to follow, which is always in a plane parallel with that of the peripheral surface of the pattern, the oscillation caused by the anti-friction rollers following the peripheral surface of the pattern, will continually maintain it in the same parallel relation.

It is obvious that the detail construction of the parts described may be changed within the scope of the appended claims, without departing from the principle of the invention, which consists in providing an oval cutting or marking machine with adjustable means whereby an oval or elliptical shape may be cut, marked, or described to conform exactly with that of the pattern; or by which an oval shape may be cut, marked or described, having the same major axis as that of the pattern and a minor axis greater than that of the pattern; or by which an oval shape may be cut, marked, or described, having both the major and minor axes greater than those of the pattern, but maintaining the same constant of difference between them; and also by which the angular relation of the tool may be changed to bring the tool point into operative relation with the work.

Having thus fully described the nature of our invention, what we claim as new and desire to secure by Letters Patent, is:—

1. An oval cutting or marking machine comprising a rotatable work support, a rotatable pattern, a cutting or marking tool, adjustable arms associated with said tool pressing upon the pattern to govern the position of the tool with respect to the geometrical center of the rotatable work support during the rotation of the pattern, and means for adjusting said arms to vary their angular relation to the pattern.

2. An oval cutting or marking machine comprising a rotatable work support, a rotatable pattern, a swinging arm associated therewith, a cutting or marking tool carried by the swinging arm, adjustable arms associated with the tool pressing upon the pattern to govern the position of the tool with respect to the geometrical center of the rotatable work support, and means for adjusting said arms to vary their angular relation to the pattern.

3. An oval cutting or marking machine, comprising a rotatable work support, a rotatable pattern, a swinging arm associated therewith, a cutting or marking tool having an oscillating shaft mounted in the swinging arm and a head therefor, pivoted arms adjustably carried by the said head pressing on the rotatable pattern, and means for adjusting said pivoted arms to govern the position of the tool with respect to the geometrical center of the rotatable work support.

4. In an oval cutting or marking machine, a rotatable work support, a rotatable pattern, a swinging arm associated therewith, a cutting or marking tool provided with a shaft oscillatingly mounted in the swinging arm, and means governing the position of said tool with respect to the geometrical center of the rotatable work support, comprising a dovetail block fixed on said shaft, a sliding head mounted on said block, means for adjusting the sliding head on said block, a sliding block contained in the sliding head, arms pivoted to the sliding block and pressing upon the pattern, whereby the position of the tool is governed by the pattern during its rotation, and means for adjusting the sliding block to determine the angular relation of the pivoted arm to the pattern.

5. An oval cutting or marking machine, comprising a rotatable work support, a rotatable pattern, a swinging arm associated therewith, a cutting or marking tool provided with a shaft oscillatingly mounted in the swinging arm, a dovetail block fixed on said shaft, a sliding head mounted on said block, and means for adjusting the sliding head thereon.

6. In an oval cutting or marking machine, a rotatable work support, a rotatable pattern, a swinging arm associated therewith, a cutting or marking tool provided with a shaft oscillatingly mounted in said swinging arm, and means associated with said tool, comprising pivoted arms pressing upon the pattern and governing the position of said tool with respect to the geometrical center of the rotatable work support during the rotation of the pattern, and means for adjusting said arms to vary their angular relation to the pattern.

7. An oval cutting or marking machine comprising a rotatable work support, a shaft located above and opposed to said work support, a pattern fixed to said shaft, means for causing the united revolution of said work support and pattern, a yielding tool-carrying arm, means associated with said arm pressing upon said pattern whereby an oscillating movement is imparted to said arm during the rotation of said shaft, means for tensioning said arm to maintain it in operative relation with said pattern, a cutting or marking tool, and adjustable means for connecting said tool to the tool-carrying arm whereby the angular relation of the tool to the rotatable work support can be changed without varying the relative position of the tool thereto.

8. An oval cutting or marking machine comprising a rotatable work support, a rotatable pattern revoluble unitedly therewith, a yielding tool-carrying arm, adjustable means carried by said arm pressing on said pattern to vary the position of the arm with respect to the geometrical center of the work support during the rotation of the pattern, a tool, and means for adjustably connecting the tool to the tool-carrying arm whereby the angular relation of the tool to the rotatable work support can be changed without varying its relative position thereto.

9. An oval cutting or marking machine, comprising a rotatable table, a rotatable hollow shaft opposed to the rotatable table and revoluble unitedly therewith, a tensioned presser opposed to said rotatable table passing through said hollow shaft, a pattern fixed to said hollow shaft, a yielding arm, a tool carried by said arm and means for tensioning said arm to continually maintain it in operative relation with said pattern.

10. An oval cutting or marking machine, comprising a rotatable table having its rim provided with gear teeth, a pinion meshing with said gear teeth, a shaft for said pinion, a second pinion mounted on said shaft, a hollow shaft revolubly supported above the rotatable table, a pattern fixed to said hollow shaft, a gear wheel fixed on said hollow shaft meshing with said second pinion whereby said rotatable table, hollow shaft, and pattern will revolve unitedly, a tensioned presser opposed to said rotatable table passing through said hollow shaft, a yielding arm, a tool carried by said arm, and means for tensioning said arm to continually maintain it in operative relation with the pattern.

11. An oval cutting or marking machine, comprising a rotatable table having its rim provided with gear teeth, a pinion meshing with said gear teeth, a shaft for said pinion, a second pinion mounted on said shaft, a hollow shaft revolubly supported above the rotatable table, a pattern fixed to said hollow shaft, a gear wheel fixed on said hollow shaft meshing with said second pinion whereby said rotatable table, hollow shaft, and pattern will revolve unitedly, a tensioned presser opposed to said rotatable table passing through said hollow shaft, a yielding arm, a tool carried by said arm, means for tensioning said arm to continually maintain it in operative relation with the pattern, and means for adjusting the rotatable table vertically with respect to said tool.

12. An oval cutting or marking machine, comprising a rotatable table, a shaft located above and opposed to said table, a pattern fixed to said shaft, means for causing the united revolution of said table and pattern, a yielding tool carrying arm, means associated with said arm pressing upon said pattern, whereby an oscillating movement is imparted to said arm during the rotation of said shaft, and means for tensioning said arm to maintain it in operative relation with said pattern.

13. An oval cutting or marking machine comprising a rotatable work support, a shaft located above and opposed to said work support, a pattern fixed to said shaft, means for causing the united revolution of said work support and pattern, a yielding tool-carrying arm, adjustable means associated with said arm pressing upon the pattern to govern the position of said arm with respect to the geometrical center of the rotatable work support during the rotation of the pattern, and means for tensioning the said arm to maintain it in operative relation with said pattern.

14. An oval cutting or marking machine comprising a rotatable work support, a shaft located above and opposed to said work support, a pattern fixed to said shaft, means for causing the united revolution of said work support and pattern, a yielding tool-carrying arm, means for tensioning said arm to maintain it in operative relation with said pattern, adjustable elements associated with the tool-carrying arm pressing upon the pattern to govern the position of the tool-carrying arm with respect to the geometrical center of the rotatable work support during the rotation of the pattern, and means for adjusting the adjustable elements to vary their angular relation with respect to the pattern.

Toronto, March 21st, 1912.

WILLIAM C. H. BECK.
HENRY R. ASTRIDGE.
ARI C. WHITTEKER.

Signed in the presence of—
EDWARD P. BERNSTEIN,
L. K. CHESWRIGHT.